(12) United States Patent
Williams et al.

(10) Patent No.: US 10,062,918 B2
(45) Date of Patent: Aug. 28, 2018

(54) FLOW BATTERY ELECTROLYTE COMPOSITIONS CONTAINING A CHELATING AGENT AND A METAL PLATING ENHANCER

(71) Applicants: PRIMUS POWER CORPORATION, Hayward, CA (US); COVENTYA, INC., Brooklyn Heights, OH (US)

(72) Inventors: Nicholas Williams, San Francisco, CA (US); John Joseph Curley, San Francisco, CA (US); Hooman Hafezi, Redwood City, CA (US); George S. Bokisa, Sr., North Olmsted, OH (US); Stephen Joseph Carpmail, New Hartford, NY (US); Joseph Brian Apisdorf, Beachwood, OH (US)

(73) Assignees: PRIMUS POWER CORPORATION, Hayward, CA (US); COVENTYA, INC., Brooklyn Heights, OH (US)

( * ) Notice: Subject to any disclaimer, the term of this patent is extended or adjusted under 35 U.S.C. 154(b) by 54 days.

(21) Appl. No.: 15/066,045

(22) Filed: Mar. 10, 2016

(65) Prior Publication Data
US 2016/0276691 A1    Sep. 22, 2016

Related U.S. Application Data

(60) Provisional application No. 62/135,354, filed on Mar. 19, 2015.

(51) Int. Cl.
*H01M 8/18* (2006.01)

(52) U.S. Cl.
CPC ........ *H01M 8/188* (2013.01); *H01M 2250/10* (2013.01); *H01M 2300/0002* (2013.01); *Y02B 90/14* (2013.01); *Y02E 60/528* (2013.01)

(58) Field of Classification Search
CPC .......... H01M 8/08; H01M 8/188; H01M 8/20; H01M 2250/10; H01M 2300/0002
USPC .......................................................... 429/105
See application file for complete search history.

(56) References Cited

U.S. PATENT DOCUMENTS

| | | |
|---|---|---|
| 3,360,366 A | 12/1967 | Bonis |
| 3,516,862 A | 6/1970 | Van Der Grinten |
| 3,640,770 A | 2/1972 | Zito, Jr. |
| 3,713,888 A | 1/1973 | Symons |

(Continued)

FOREIGN PATENT DOCUMENTS

| | | |
|---|---|---|
| JP | 58-007773 | 1/1983 |
| JP | 04-242080 | 8/1992 |
| WO | WO2013-168145 A1 | 11/2013 |

OTHER PUBLICATIONS

Bass "Methods for the reduction of shape change and dendritic growth in zinc-based secondary cells," Journal of Power Sources 35 (1991) 333-351.*

(Continued)

*Primary Examiner* — Jonathan Jelsma
*Assistant Examiner* — Rashid Alam
(74) *Attorney, Agent, or Firm* — The Marbury Law Group PLLC (57) ABSTRACT

An aqueous electrolyte for a metal-halogen flow battery includes an electrolyte that includes zinc bromide, a chelating agent, and a metal plating enhancer. The metal plating enhancer may include Bi, Pb, Te, Se, and/or Tl, salts thereof, or any combination thereof.

9 Claims, 5 Drawing Sheets

(56) References Cited

U.S. PATENT DOCUMENTS

| | | | |
|---|---|---|---|
| 3,785,868 A | | 1/1974 | Devitt |
| 4,181,777 A | | 1/1980 | Spaziante et al. |
| 4,306,003 A | | 12/1981 | Henriksen |
| 4,307,159 A | | 12/1981 | Hammond et al. |
| 4,473,625 A | | 9/1984 | Watakabe et al. |
| 4,479,856 A | | 10/1984 | Ando |
| 4,510,218 A | * | 4/1985 | Ando ............... H01M 10/365 429/101 |
| 4,518,663 A | | 5/1985 | Kodali et al. |
| 7,232,513 B1 | * | 6/2007 | Webb ............... C25D 3/38 205/123 |
| 7,560,189 B2 | * | 7/2009 | Clarke ............... H01M 4/368 429/105 |
| 8,039,161 B2 | | 10/2011 | Winter |
| 8,795,836 B2 | * | 8/2014 | Kaylo ............... C09D 5/44 205/118 |
| 8,945,739 B2 | | 2/2015 | Cole et al. |
| 9,130,217 B2 | | 9/2015 | Cole et al. |
| 2004/0197649 A1 | | 10/2004 | Clarke et al. |
| 2006/0257744 A1 | | 11/2006 | Burchardt |
| 2010/0021805 A1 | * | 1/2010 | Winter ............... H01M 12/085 429/101 |
| 2011/0073484 A1 | * | 3/2011 | Kawagoshi ............... C23C 22/50 205/183 |
| 2011/0189520 A1 | | 8/2011 | Carter et al. |
| 2011/0253553 A1 | * | 10/2011 | Bergstein Freiberg ............... H01M 10/365 205/619 |
| 2012/0219832 A1 | * | 8/2012 | la O' ............... H01M 8/186 429/50 |
| 2013/0256145 A1 | * | 10/2013 | Romer ............... C25D 3/60 205/253 |
| 2014/0308547 A1 | | 10/2014 | Cole et al. |

OTHER PUBLICATIONS

AkzoNobel (https://www.akzonobel.com/dissolvine/system/images/akzonobel_hedta_08-2011_tcm108-76618.pdf with a publication date of Aug. 24, 2011).*

Mallapur, D.G. et al., "Influence of Grain Refiner and Modifier on the Microstructure and Mechanical Properties of A356 Alloy," International Journal of Engineering Science and Technology, vol. 2, No. 9, pp. 4487-4493, (2010).

University of Delaware, Department of Chemistry and Biochemistry, "Physical Properties: The Four Most Common Glass Types Utilized by UD Research Groups," Scientific GlassBlowing Shop, pp. 1-5, http://www.udel.edu/chem/GlassShop/PhysicalProperties.htm, (2010).

Dissolvine Master the Elements, Chelates Product Guide, Pamphlet, 13 pages, (2010).

Pollard, W. A. et al., "The Grain Refinement of Zinc-Aluminum Alloys by Titanium," Maney Oline, Maney Publishing's Online Platform, Canadian Metallurgical Quarterly, vol. 13, No. 4, 2 pages, (1974).

The International Search Report and Written Opinion of the International Searching Authority for International Application No. PCT/US2016/021676, dated Aug. 18, 2016, 10 pages.

International Preliminary Report on Patentability from the International Searching Authority for International Application No. PCT/US2016/021676, dated Sep. 28, 2017, 6 pages.

* cited by examiner

FLOW BATTERY ELECTROLYTE COMPOSITIONS CONTAINING A CHELATING AGENT AND A METAL PLATING ENHANCER

FIELD

The present disclosure is directed to flow battery electrolytes and systems including the same.

BACKGROUND

The development of renewable energy sources has revitalized the need for large-scale batteries for off-peak energy storage. The requirements for such an application differ from those of other types of rechargeable batteries such as lead-acid batteries. Batteries for off-peak energy storage in the power grid generally are required to be of low capital cost, long cycle life, high efficiency, and low maintenance.

One type of electrochemical energy system suitable for such an energy storage is a so-called "flow battery" which uses a halogen component for reduction at a normally positive electrode in discharge mode, and an oxidizable metal adapted to become oxidized at a normally negative electrode during the normal operation of the electrochemical system. An aqueous metal halide electrolyte is used to replenish the supply of halogen component as it becomes reduced at the positive electrode. The electrolyte is circulated between the electrode area and a reservoir area. One example of such a system uses zinc as the metal and chlorine as the halogen.

Such electrochemical energy systems are described in, for example, U.S. Pat. Nos. 3,713,888, 3,993,502, 4,001,036, 4,072,540, 4,146,680, and 4,414,292, and in EPRI Report EM-I051 (Parts 1-3) dated April 1979, published by the Electric Power Research Institute, the disclosures of which are hereby incorporated by reference in their entirety.

SUMMARY

An embodiment relates to an aqueous electrolyte composition for use in a flow battery, comprising: zinc bromide; a chelating agent, at least one metal plating enhancer; and a bromine sequestering agent.

Another embodiment relates to an aqueous electrolyte composition for use in a flow battery, comprising: zinc bromide; at least one metal plating enhancer comprising at least one or more of Bi, Pb, Te, Se, Tl, salts thereof, or combinations thereof; and a bromine sequestering agent.

Another embodiment relates to a flow battery including one of the above electrolytes.

DETAILED DESCRIPTION

Traditional electrolytes used for zinc-bromide flow batteries yield lower than desired energy capacity and energy efficiency.

Embodiments of the present invention are drawn to an electrolyte composition for use in a metal-halogen flow battery system or the method of using an electrolyte composition in a flow battery system. One non-limiting advantage of the electrolyte composition is that the zinc-bromide flow battery benefits from improved performance metrics (i.e., both increased energy capacity and energy efficiency) by only changing the composition of the electrolyte solution. In other words, no hardware or operational changes are required to benefit from the various embodiments of the electrolyte compositions.

The electrolyte described herein has functional advantages in that it allows for battery cycles (i.e. consecutive charge-and-discharge) that are characterized by higher energy capacities and energy efficiencies. Additionally, these sustained improvements in performance that are sustained over several thousand charge and discharge cycles.

Specifically, in an embodiment, the energy capacity of the battery is enlarged with a longer discharge duration at a constant power discharge. Additionally, the energy efficiency of the battery is improved by 10-400%, such as by 100-400% when compared to traditional additive free zinc bromide ($ZnBr_2$) systems that plate only to 90 mAh/cm$^2$.

The liquid electrolyte solution has a base formulation, which includes other additive(s). Judicious selection of the additives shows that the energy efficiency and energy capacity of the battery are increased when the additives are added to the electrolyte solution.

When the additives are present in the zinc-bromide battery electrolyte, the morphology of the zinc deposit on the negative electrode (i.e., in charge mode) is smoother than in the absence of these additives. This smoothing effect is more important for zinc deposited in a channel of a flow battery (e.g., a gap between battery components where zinc is plated). For example, zinc may be deposited in such a flow channel to a thickness that represents about 25% to 50% of the width/depth of the flow channel. For example, a flow channel may have width of from about 1.0 mm to about 2 mm, while zinc may be plated to a thickness of about 1.0 mm to about 1.5 mm. In this situation, any rough or dendritic growth may lead to contact with a zinc deposit of a counter electrode (for membraneless flow batteries) or with a separator membrane, which may cause irreversible damage. As such, the importance of a smooth zinc plating profile is increased when used in the narrow flow channels of a flow battery.

In practice, the effect of the electrolyte is a sustained increase in both energy capacity and energy efficiency of the battery. Without wishing to be bound to any particular theory, it is believed that the sustained improvement in energy capacity and energy efficiency arises from a smoother morphology of the zinc deposit that results in the ability to fill the zinc charge gap more efficiently and a decrease rate of corrosion of the zinc deposit.

In one embodiment, the improved performance of the metal-halide battery is achieved by selecting electrolyte components to simultaneously achieve the following:

Reducing or eliminating dendrite or nodule formation of a significant height in the metal deposit of the metal (e.g., zinc) on the negative electrode during charge mode. For example, the deposited metal (e.g., zinc) layer lacks any nodule or dendrite whose height is approximately 10% or more of the average metal layer thickness or flow gap width.

Reducing the corrosion rate of metal (e.g., zinc) during charge and discharge.

Maintaining the voltaic performance of the positive and negative electrode (i.e., preventing significant reduction) and the ohmic resistance of the electrolyte (i.e., preventing increases) while reducing dendrite formation of metal deposits on the negative electrode and reducing the corrosion rate of the metal (e.g., zinc).

Maintaining a high degree of stability in the presence of bromine, which tends to oxidize many organic and inorganic species.

Suppressing side reactions, such as the generation of hydrogen gas, by maintaining pH within a preferred acidic range (e.g., pH 1 to 4, such as 2 to 4).

Various embodiments of electrolyte formulations that fulfill one or more of the above characteristics are discussed below.

In an embodiment, the electrolyte composition for use in a flow battery may include an aqueous (i.e., water) solution including a metal halide, a halogen, and at least one of an anti-dendrite agent and an anti-corrosion agent. In an embodiment, the halogen may include chlorine and/or bromine. In an embodiment, the halogen in the electrolyte composition is bromine ($B_2$).

When the halogen is bromine, then the base composition is a metal halide that comprises a metal bromide, such as zinc bromide. The electrolyte also includes a bromine sequestering agent. Preferably, the electrolyte composition includes a halogen of about 1-7% (w/v) bromine More preferably, the electrolyte composition includes about 3.75-4.1% (w/v) or 0.15-0.4 M bromine, such as 3.80-3.90% (w/v) bromine.

Weight percent or weight/volume percent ("% (w/v)") as used throughout this application is the mass of the solute in grams over the volume of the solution in milliliters, multiplied by 100.

In an embodiment, the metal of the metal halide may be zinc and the halide may be bromine or both bromine and chlorine. For example, the metal halide may be zinc bromide ($ZnBr_2$) or zinc bromide and zinc chloride ($ZnCl_2$). Preferably, the metal halide is both zinc bromide and zinc chloride.

In an embodiment, the aqueous solution includes about 0.1-68% (w/v) (or about 0.004-3 M) zinc bromide. In an embodiment, the aqueous solution includes about 0.1-68% (w/v) zinc bromide and about 0-30% (w/v) (or 0-2.2 M) zinc chloride, including 0.1-14% (w/v) zinc chloride. Preferably, the aqueous solution includes about 34-44% (w/v) zinc bromide and about 3-7% (w/v) zinc chloride.

More preferably, the electrolyte composition also includes a bromine-sequestering (i.e. complexing or binding) agent and the halogen of the electrolyte composition is complexed bromine, preferably substantially without free chlorine.

Sequestering Agent

In an embodiment, the sequestering agent is a single bromine sequestering agent or more than one bromine sequestering agent (i.e., a mixture of two or more sequestering agents). It should be noted, that although the sequestering agent is referred to in the singular, it is envisioned that the sequestering agent may be one or more compounds. Thus, a "sequestering agent" or a "bromine sequestering agent" may include one or more sequestering/complexing compound.

In an embodiment, the sequestering agent is at least one of a morpholinium, pyrrolidinium, imidazolium, picolinium or pyridinium salt, and a quaternary ammonium bromide (QBr). In an embodiment, the bromine sequestering agent is at least one of 1-dodecyl-1-methylmorpholinium bromide, 1-dodecyl-1-methylpyrrolidinium bromide, 1-dodecylpyridinium bromide, dodecyltrimethylammonium bromide, benzyldodecyldimethylammonium bromide, tetrabutylammonium bromide, 1-ethyl-1-methylpyrrolidinium bromide (MEP), and 1-ethyl-1-methyl-morpholinium bromide (MEM). In an embodiment, these compounds include any substitution derivatives of the compounds listed (e.g., those containing additional alkyl substituents) as well as different alkyl chain lengths. Preferably, the electrolyte composition includes about 7-27% (w/v) of the bromine sequestering agent. More preferably, the electrolyte composition includes the bromine sequestering agent of about 14-23% (w/v) of the bromine sequestering agent. According to some embodiments, the sequestering agent may be any of the bromine sequestering/complexing agents disclosed in PCT Application WO 2013/168145, which is incorporated herein, by reference, in its entirety.

Without wishing to be bound to any particular theory, it is believed the bromine sequestering agent forms a thin layer of complexed bromine on the bottom of the porous (positive) electrode (described below) without attacking the metal (e.g., zinc) on the top electrode.

In an embodiment, the electrolyte composition includes the anti-dendrite agent without the anti-corrosion agent or the anti-corrosion agent without the anti-dendrite agent. Preferably, the electrolyte composition includes both the anti-dendrite agent and the anti-corrosion agent. More preferably, at least one of the anti-dendrite and the anti-corrosion agents is anionic or non-ionic poly(ethylene oxide) derivatives, such as either polyoxyethylene(20) oleyl ether (e.g., Brij™ 98) or poly-ethylene glycol, for a sustained increase in both energy capacity and energy efficiency of a zinc-bromide flow battery.

In another embodiment, the electrolyte composition includes a metal plating enhancer without an anti-corrosion agent or an anti-dendrite agent. For example, the electrolyte composition may include a bismuth salt (e.g., bismuth oxide ($Bi_2O_3$), bismuth citrate, bismuth chloride) as a metal plating enhancer along with an aqueous solution of zinc bromide ($ZnBr_2$) and zinc chloride ($ZnCl_2$) and a bromine sequestering agent.

Anti-Dendrite/Plating Agents

In an embodiment, the anti-dendrite agent in the electrolyte composition is at least one of an alkali salt of sulfopropylated polyalkoxylated beta-naphthol, poly(oxy ether), bisphenol A alkoxylate, and nicotinic acid. Preferably, the anti-dendrite agent is a surfactant such as PEG and/or bisphenol A alkoxylate. An example of the alkali salt of sulfopropylated polyalkoxylated beta-naphthol is RALUFON® NAPE 14-90 made by Raschig. An example of the bisphenol A alkoxylate is Syn Fac® made by Milliken and Company, such as Syn Fac® 8120. An example, of the poly(oxy ether) is PEG, such as PEG with a molecular weight of at least 4000 (e.g., PEG with a molecular weight of at least 8000, including 8000 to 50000). As a further example, PEG may have a molecular weight of any amount between 4000 and 50,000, such as 4000 to about 31,000 (e.g., about 4000, 4500, 5000, 5500, 6000, 6500, 7000, 7500, 8000, 8500, 9000, 9500, 10,000, 10,500, 11,000, 11,500, 12,000, 12,500, 13,000, 13,500, 14,000, 14,500, 15,000, 15,500, 16,000 16,500, 17,000, 17,500, 18,000, 18,500, 19,000, 19,500, 20,000, 20,500, 21,000, 21,500, 22,000, 22,500, 23,000, 23,500, 24,000, 24,500, 25,000, 25,500, 26,000, 26,500, 27,000, 27,500, 28,000, 28,500, 29,000, 29,500, 30,000, 30,500, or 31,000).

In an embodiment, during charge mode of the flow battery, one or more of the anti-dendrite agents added to the electrolyte solution may reduce the amount of metal (e.g., zinc) dendrites forming during their deposits on the negative electrode.

In an embodiment, the electrolyte composition includes an anti-dendrite agent of about 0.01-1.5% (w/v) of an alkali salt of sulfopropylated polyalkoxylated beta-naphthol and about 0.001-0.1% (w/v) nicotinic acid. Preferably, the electrolyte composition includes an anti-dendrite agent of about 0.09-0.4% (w/v) of an alkali salt of sulfopropylated polyalkoxylated beta-naphthol and about 0.0-0.01-0.07% (w/v) nicotinic acid. More preferably, the electrolyte composition includes an anti-dendrite agent of about 0.2% (w/v) alkali salt of sulfopropylated polyalkoxylated beta-naphthol and about 0.04% (w/v) nicotinic acid. The anti-dendrite agent may include any weight percent increment of an alkali salt of sulfopropylated polyalkoxylated beta-naphthol between about 0.01-1.5% (w/v), such as about 0.01, 0.02, 0.03, 0.04, 0.05, 0.06, 0.07, 0.08, 0.09, 0.10, 0.11, 0.012, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.30. The anti-dendrite agent may include any weight percent increment of nicotinic acid between about 0.001-0.1% (w/v), such as about 0.020, 0.021, 0.022, 0.023, 0.024, 0.025, 0.026, 0.027, 0.028, 0.029, 0.030, 0.031, 0.032, 0.034, 0.035, 0.036, 0.037, 0.038, 0.039, 0.040, 0.041, 0.042, 0.043, 0.044, 0.045, 0.046, 0.047, 0.048, 0.049, or 0.050.

In an embodiment, the electrolyte composition includes an anti-dendrite agent of about 0.01-5% (w/v) bisphenol A alkoxylate, such as about 0.1-4% (w/v) bisphenol A alkoxylate. Preferably, the electrolyte composition includes an anti-dendrite agent of about 0.5-3% (w/v) bisphenol A alkoxylate. More preferably, the electrolyte composition includes an anti-dendrite agent of about 1.4% (w/v) bisphenol A alkoxylate. The anti-dendrite agent may include any weight percent increment of bisphenol A alkoxylate between about 0.01-5% (w/v), such as about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0.

Anti-Corrosion Agent

In an embodiment, the electrolyte composition includes an anti-corrosion agent. Preferably, the anti-corrosion agent is at least one of benzotriazole, zinc phosphate, triethylamine, ethanolamine, and poly(oxy ether). In an embodiment, the anti-corrosion agent is the poly(oxy ether) such as PEG with a molecular weight of at least 4000. In an alternative embodiment, the poly(oxy ether) has a molecular weight of at least 8000, such as 8000 to 30000. Preferably, the electrolyte composition includes poly(oxy ether) (e.g., PEG) as the anti-corrosion agent with a molecular weight of 18000-25000. For example, the PEG may have a molecular weight of any increment between 4000 and 30000, such as about 4000, 4500, 5000, 5500, 6000, 6500, 7000, 7500, 8000, 8500, 9000, 9500, 10,000, 10,500, 11,000, 11,500, 12,000, 12,500, 13,000, 13,500, 14,000, 14,500, 15,000, 15,500, 16,000 16,500, 17,000, 17,500, 18,000, 18,500, 19,000, 19,500, 20,000, 20,500, 21,000, 21,500, 22,000, 22,500, 23,000, 23,500, 24,000, 24,500, 25,000, 25,500, 26,000, 26,500, 27,000, 27,500, 28,000, 28,500, 29,000, 29,500, or 30,000.

In an embodiment, the anti-corrosion agent is about 0.1-2% (w/v) poly(oxy ether) (e.g., PEG), preferably 0.05-1.5% (w/v) poly(oxy ether) (e.g., PEG). For example, the anti-corrosion agent may include any weight percent increment of a poly(oxy ether) between about 0.1-2% (w/v), such as about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0.

In an embodiment, the anti-corrosion agent reduces the corrosion rate (i.e., dissolution) of the metal (e.g., zinc) during the charge and discharge modes of the flow battery. In an embodiment, the electrolyte solution includes about 0-5% (w/v) (e.g. 1-3% (w/v)) of an anti-corrosion agent.

Other Additives

In various other embodiments, the electrolyte composition may include one or more optional/additional additives. The additives may be selected from at least one of a chelating agent and a metal plating enhancer. In an embodiment, the electrolyte composition comprises any number combinations of the additives with the metal-halide aqueous solution, the sequestering agent, the halogen, and/or the optional anti-dendrite agent. Generally, all additives may include about 0-5% (w/v) (e.g., 1-3% (w/v)) of the electrolyte composition. Each type of additive is discussed below.

Chelating Agents

In various embodiments, the electrolyte composition includes the chelating agent as the additive. Herein, a "chelating agent" may refer to a solubilizing ligand or solubilizing chelating agent. In various embodiments, the chelating agent one or more amines, such as an aminopolycarboxylic acid, such as ethylenediaminetetraacetic acid (EDTA) ($C_{10}H_{16}N_2O_8$) or derivatives thereof or hydroxyethylethylenediaminetriacetic acid (HEDTA) or derivatives thereof. For example, the chelating agent may include a sodium or potassium salt of EDTA (e.g., tetrasodium of EDTA available from AkzoNobel as Dissolvine® E-39), or a sodium salt of HEDTA (e.g., trisodium of HEDTA, available from AkzoNobel as Dissolvine® H-40).

Other non-limiting examples of amine chelating agents include:

diethylene triamine pentaacetic acid (DTPA) and sodium or potassium salts thereof;

glutamic acid, N,N-diacetic acid (GLDA) and sodium salts thereof (available from AkzoNobel as Dissolvine® GL);

ethanoldiglycinic acid (EDG) and sodium salts thereof;

1,3-Propylenediaminetetraacetic acid (PDTA);

nitrilotriacetic acid $N(CH_2CO_2H)_3$ (NTA) and sodium salts thereof; or a polyol, such as N, N, N', N'-Tetrakis (2-hydroxypropyl) ethylene-diamine (available from BASF Corporation as Quadrol®).

According to some embodiments, the chelating agent may include HEDTA, which is also known as "N-{2-[Bis(carboxymethyl)amino]ethyl}-N-(2-hydroxyethyl)glycine" or ($C_{10}H_{18}N_2O_7$), which may be represented by the following structural formula:

In particular, the present inventors have discovered that HEDTA facilitates partitioning of a metal plating enhancer described below from the ionic QBr phase of the electrolyte into an aqueous phase of the electrolyte.

According to various embodiments, the chelating agent may alternatively be one or more of: a phosphate, a phosphonate, or another carboxylate with chelating properties. Carboxylates with chelating properties include but are not limited to glycine, citrate, oxylate or acetate (e.g., sodium acetate, also known as sodium salt of acetic acid (NaOAc)).

Non-limiting examples of phosponate chelating agents include:

Amino tri (methylene phosphonic acid) (ATMP);
1-Hydroxyl ethylidene-1,1,-diphosphonic acid (HEDP) (available as Dequest® from Italmatch Chemicals);
Ethylidenediamine tris(mehylene phosphonic acid) (EDTMP);
Hexamethylenediamine tetra(methylene phosphonic acid) and potassium salts thereof;
Diethylenetriamine penta(methylene phosphonic acid) (DTPMP) and salts thereof;
Polyamino phosphonic acids; or
Diethylenetriamine penta(mehylene phosphonic acid) and sodium salts thereof.

Non-limiting examples of phosphate chelating agents include sodium triphosphate, potassium triphosphate, pyrophosphates, including disodium, sodium acid, and polyphosphates.

The electrolyte may contain more than one chelating agent in any combination from the list above.

Metal Plating Enhancers

In an embodiment, the electrolyte composition includes a metal plating enhancer as an additive. In an embodiment, the electrolyte composition includes a metal plating enhancer such as a metal salt. In an embodiment, the electrolyte may include a metal plating enhancer including at least one or more of Bi, Pb, Te, Se, Tl, and salts thereof. For example, the plating enhancer may be a combination of Bi and Pb salts. Alternatively, the plating enhancer may include a tellurium, selenium or thallium salt, alone or in combination with the lead and/or bismuth salt.

For example, the plating enhancer may include at least one or more of bismuth oxide ($Bi_2O_3$), bismuth citrate, bismuth chloride, lead chloride ($PbCl_2$), lead bromide ($PbBr_2$), thallium chloride, thallium bromide, tellurium bromide ($Te_2Br$ and/or $TeBr_4$), selenium bromide (e.g., $Se_2Br_2$ and/or $SeBr_4$), or selenium chloride ($Se_2Cl_2$). In one embodiment, the electrolyte contains at least one of thallium, tellurium or selenium metal plating enhancer, such as thallium chloride, thallium bromide, tellurium bromide ($Te_2Br$ and/or $TeBr_4$), selenium bromide (e.g., $Se_2Br_2$ and/or $SeBr_4$), or selenium chloride ($Se_2Cl_2$), without including the chelating agent, such as HEDTA.

According to some embodiments, a flow battery may include an electrolyte that includes the chelating agent and at least one or more of the Pb, Bi Te, Se, and Tl containing metal plating enhancers. In some embodiments, the electrolyte may include the HEDTA chelating agent and at least one or more of Te, Se, and Tl containing metal plating enhancers described above. In some embodiments, the electrolyte may include HEDTA and $PbCl_2$, $PbBr_2$, or a combination of $PbCl_2$ and $PbBr_2$ plating enhancers. This electrolyte may further contain the above described anti-dendrite agent and/or the anti-corrosion agent and/or any one or more additional additives described herein. Alternatively, the electrolyte may exclude the above described anti-dendrite agent and/or the anti-corrosion agent and/or any one or more additional additives described herein.

As an example, an electrolyte including HEDTA, and Pb and Bi as plating enhancers, will be discussed. However, the following description may be equally applicable to any of the above plating enhancers.

Without wishing to be bound by a particular theory, it is believed that HEDTA helps solubilize the metal plating enhancer, such as Pb and/or Bi in the aqueous phase of the electrolyte, by binding to Pb or Bi located in the ionic QBr phase by forming plural bonds to a single metal Pb or Bi ion to form a multidentate ligand. It is also believed that after binding to Pb or Bi, HEDTA then partitions from the ionic phase into the aqueous phase. It is also believed that the metal plating enhancer Pb, Bi, etc.) is active in the aqueous phase but is inactive in the ionic phase of the electrolyte. In other words, the plating enhancer located in the aqueous phase can assist in forming a smoother zinc deposit onto the non-porous negative electrodes of the flow battery, while the plating enhancer located in the ionic phase does not perform this function. Thus, it is believed that HEDTA helps to partition the inactive metal plating enhancer salt (e.g., lead or bismuth chloride) from the ionic phase into the aqueous phase where the metal plating enhancer becomes active.

The metal plating enhance is resent in both aqueous and Qbr phase of the electrolyte. According to some embodiments, the QBr ionic phase may include from about 10% to about 65% of the plating enhancer and/or other additives. For example, the QBr phase may include from about 20% to about 60%, or about 50%, of the plating enhancer and/or other additives.

When the flow battery is charged, the concentration of the Pb and/or Bi (e.g., Pb and/or Bi salt) is reduced in the aqueous phase, as they codeposit along with Zn onto the electrode of the flow battery. However, one or more of these metal plating enhancers may be replenished in the aqueous phase by being withdrawn from the ionic QBr phase.

It is believed that Bi is most beneficial during the early stages of Zn plating, but may be less beneficial during later stages of Zn plating. As such, it is desirable to have the maximum concentration of Bi (e.g., bismuth salt) present in the aqueous phase of the electrolyte at the start of the charge mode of the flow battery to ensure that the maximum amount of Bi is removed from the ionic phase at the start of plating. In this case, a relatively large amount of the chelating agent may be added to the electrolyte.

In contrast, it is believed that Pb is beneficial throughout the Zn plating during charge mode. As such, an amount of Pb (e.g., lead salt) may be set such that the Pb concentration in the aqueous phase remains as constant as possible during the Zn plating. In this case, a smaller amount of chelating agent may be added to the electrolyte to gradually partition the lead from the ionic phase to the aqueous phase during charging of the flow battery. Finally, including both Pb and Bi metal plating enhancer in an electrolyte may provide for Zn layers with the smoothest profiles.

According to some embodiments, an electrolyte may include about 15-200 ppm, such as 25-100 ppm of the metal plating enhancer (e.g. lead, in the form of a lead salt such as PbBr$_2$ and/or PbCl$_2$), and HEDTA, in the form of 0.1 to 5 ml/L, such as 1 to 3 ml/L Dissolvine® H-40. In other embodiments, an electrolyte may include HEDTA and similar concentrations of other metal salts (plating enhancers), either alone or in combination. According to other embodiments, the electrolyte may further include an aqueous solution which contains about 0.004-3 M, such as 1.64-1.96M zinc bromide, 0-2.2 M, such as 0.36-0.74 M zinc chloride and 0.5 to 1.5 M sequestering agent (QBr). The electrolyte may also include the above mentioned anti-corrosion and/or anti-dendrite agents.

Anti-Dendrite Agent Free Embodiment Compositions

In an embodiment, the electrolyte composition includes an aqueous solution including zinc bromide (ZnBr$_2$) and zinc chloride (ZnCl$_2$), a bromine sequestering agent, a metal plating enhancer (e.g., lead or bismuth salt), and a chelating agent such as HEDTA. In this embodiment, the anti-dendrite and anti-corrosion agent is omitted. In an embodiment, the bismuth salt is at least one of bismuth oxide, bismuth chloride, and bismuth citrate.

Anti-Dendrite Agent Containing Embodiment Compositions

In another embodiment the anti-dendrite agent is added to the electrolyte composition, which includes an aqueous solution including zinc bromide (ZnBr$_2$) and zinc chloride (ZnCl$_2$), a bromine sequestering agent, an anti-dendrite agent of bisphenol A alkoxylate, a metal plating enhancer (e.g., lead or bismuth salt), a chelating agent, such as HEDTA. In an embodiment, the bismuth salt is at least one of bismuth oxide, bismuth chloride, and bismuth citrate.

In various embodiments, improvements to performance of the metal-halide battery may be further enhanced by providing multiple performance-improvising additives to the electrolyte composition. While the performance improving actions and/or mechanisms of such additives may be similar to or different from one another, in combination these additives may achieve overall performance improvements for the metal-halide battery that are greater than the collective sum of the separate individual performance improvements.

In an embodiment, a combination of at least one polydentate ligand, such as an ethylene oxide-containing surfactant, at least one heavy metal salt, and one chelating agent may be added to the electrolyte solution to enhance the plating morphology of the metal (e.g., zinc) on the negative electrode during charge mode while remaining stable in a brominated environment. In the various embodiments, the term "heavy metal" may be used to refer to a metal that is heavier than the plating metal (e.g., heavier than zinc). In some embodiments, the ethylene oxide-containing surfactant may be a bisphenol A (BPA) alkoxylate composition (e.g., Syn Fac® 8120 made by Milliken Chemical). The BPA alkoxylate composition may have the following structure:

where "m" and "n" each represent between 8 and 24 repeating ethylene oxide units, thereby providing variable chain lengths. An example BPA alkoxylate composition (and/or compound) in which m=13 and n=14 may have a formula of $C_{69}H_{122}K_2O_{35}S_2$, where BPA provides the aromatic part of the compound and poly(ethylene oxide) makes up the polymer chains. In some embodiments, the synergistic combination of additives may include multiple ethylene oxide-containing containing surfactants, such as an additional poly(ethylene oxide) ("PEG") composition in addition to the BPA alkoxylate. In some embodiments, the PEG composition may be any number of repeated ethylene oxide units.

In other embodiments, the ethylene oxide-containing surfactant may be an alkali salt of sulfopropylated polyalkoxylated beta-naphthol (e.g., RALUFON® NAPE 14-90 made by Raschig). The alkali salt of sulfopropylated polyalkoxylated beta-naphthol may have the following structure:

where "n" represents between 1 and 3 repeating isopropanol or ethylene glycol units and "m" represents between 5 and 25 repeating ethylene oxide units, thereby providing a structure with variable chain lengths. In an example composition of the above structure, m=17 and n=2.

In other embodiments, the ethylene oxide-containing surfactant may be an ethoxylated fluorosurfactant (e.g., S-550 made by Chemguard). The ethoxylated fluorosurfactant may have the following structure:

where "n" represents between 8 and 32 repeating ethylene oxide units, thereby providing a structure with variable chain lengths. In an example composition of the above structure, n=12.

In some embodiments, the at least one heavy metal salt may be a bismuth salt (e.g., bismuth oxide (Bi$_2$O$_3$), bismuth citrate, bismuth chloride, etc.) or a lead salt (e.g., lead chloride (PbCl$_2$)). The at least one heavy metal salt may be a metal plating enhancer that initially plates the heavy metal on the negative electrode, as described in further detail above. In various embodiments including the electrolyte may also include a chelating agent such as HEDTA.

The combination of the at least one ethylene oxide-containing surfactant, one heavy metal salt, and chelating agent unexpectedly results in significant enhancements in the plating morphology of zinc during charge mode. Such enhancements may include minimizing dendrite formation in the zinc deposited on the negative electrode in charge mode thereby providing a smoother zinc deposit on the negative electrode. For example, reducing dendrite formation may be achieved if the deposited metal (e.g., zinc) lacks any dendrite whose height is approximately 10% or more of the average metal layer thickness. The smooth zinc deposit may decrease the rate of corrosion of the zinc deposit, thereby increasing the energy capacity and energy efficiency of the battery. Such enhancements may also include achieving a capacity (i.e., loading target) for the negative electrode of 200 milliampere-hour (mAh)/cm$^2$ of zinc.

Specifically, the improvements in zinc plating from the combination are greater than those that would be expected by adding the results obtained using only the ethylene oxide-containing surfactant as an electrolyte additive to the results obtained using only the heavy metal salt as an electrolyte additive.

Without wishing to be bound by a particular theory, it is believed that ethylene oxide and its derivatives bind to a metal surface, and therefore that the presence of ethylene oxide and/or ethylene oxide derivatives may affect the outcome of an electrodeposition process. Further, heavy metals (e.g., bismuth or lead) may be incorporated into a metal (e.g., zinc) being deposited. Therefore, the presence of such bismuth or lead ions may change the crystal structure of the deposit relative to one of pure zinc. Also, without wishing to be bound by a particular theory, it is believed that heavy metals (e.g., bismuth or lead) may change the morphology of zinc plating by incorporating into the deposit and changing the crystal structure of the deposit relative to one of pure zinc.

Without wishing to be bound to any particular theory, the synergistic effects of various combinations of additives to enhance plating of a metal (e.g., zinc) onto the negative electrode may be the result of a number of molecular/atomic interactions. That is, the ethylene oxide chains of Syn Fac® 8120 may bind to the surface of the zinc deposit, while the aromatic groups of the Syn Fac® 8120 may bind to the heavy metal (e.g., bismuth). For example, references in the literature demonstrate that bismuth ions interact with aromatic moieties to form arene complexes, one of which is C. Silvestru et al., "Structural Chemistry of Bismuth Compounds, I. Organobismuth Derivatives (section G, Arene Complexes of Bismuth, pages 3305-3310)," CHEMICAL REVIEWS 99:3277-3328 (1999), herein incorporated by reference in its entirety. In this manner, the bismuth or other heavy metal may be brought into the proximity of the zinc deposit. Also, without wishing to be bound by a particular theory, in the highest density regions (i.e., peaks in the deposit), ethylene oxide chains may collect in larger amounts, which may in turn case higher binding of bismuth in these regions (i.e., through the aromatic group binding), promoting flattening of the zinc deposit.

Example Formulations

In each non-limiting example formulations described below, the base formulation has a greater longevity in an operating metal-halide flow battery (i.e., a metal-halide flow battery with battery cycles that are characterized by higher energy capacities and energy efficiencies) than a traditional metal-halide electrolyte lacking similar compounds.

In an embodiment, the electrolyte composition includes an aqueous solution of a metal-halide and a halogen or a mixture of a metal-halide, a bromine halogen, and a bromine sequestering agent, and at least one of an anti-corrosion agent and anti-dendrite agent, or both an anti-corrosion agent and an anti-dendrite agent.

Base Electrolyte

In an embodiment, the electrolyte composition includes an aqueous solution of a metal-halide or a mixture of a metal-halide, a halogen, and a sequestering agent, collectively herein referred to as the "base electrolyte". Preferably, the electrolyte composition includes a base electrolyte which is a mixture of a metal-halide of about 0.1-68% (w/v) zinc bromide and about 0.1-30% (w/v) zinc chloride, a halogen of about 1-7% (w/v) bromine, and a sequestering agent that is about 7-27% (w/v) of a bromine sequestering agent. More preferably, the electrolyte composition includes a base electrolyte which includes an aqueous solution of about 34-44% (w/v) zinc bromide, about 3-7% (w/v) zinc chloride, a halogen of about 3.75-4.1% (w/v) bromine, and a sequestering agent including about 14-23% (w/v) of the bromine sequestering agent.

Formulation 1

The electrolyte composition of Formulation 1 includes the base electrolyte, lead bromide, and HEDTA. According to some embodiments, the composition of Formulation 1 may include components and amounts as indicated in Table 1, below. Although certain additives are listed below in each formulation, one skilled in the art would be able to replace certain additives for comparable additives in appropriate proportions (described above) to perform similar functions as those listed in the table below.

|   | Species | Units | 0 SOC |
|---|---------|-------|-------|
| 1 | Br2 | M | 0.50 |
| 2 | sequestering agent | M | 1.00 |
| 3 | ZnBr2 stock solution | M | 1.64 |
| 4 | ZnCl2 stock solution | M | 0.36 |
| 5 | Lead (in the form of PbBr$_2$) | ppm | 50 |
| 6 | Dissolvine ® H-40 | ml/L | 2.5 |

According to some embodiments, the electrolyte composition of Formulation 1 contains about 50 ppm of lead (in the form of lead bromide) and HEDTA in the form of about 2.5 ml/L of Dissolvine® H-40. For example, the composition of Formula 1 may include from about 10 to about 190 ppm, such as 15 to about 75 ppm of lead, including from about 25 to about 70 ppm of lead, from about 40 to about 60 ppm of lead, or from about 45 to about 55 ppm of lead. The composition of Formulation 1 may include from about 0.1 to 5 ml/L, such as 1 to 3 ml/L Dissolvine® H40.

Formulation 2

The electrolyte composition of Formulation 2 is the same as Formulation 1, except that it includes bismuth (in the form of a bismuth salt such as bismuth chloride) in addition to or instead of lead bromide. For example, the composition of Formula 2 may include from about 0-190 ppm lead and from about 10 to 200 ppm, such as 15 to 100 ppm bismuth (in the form of a bismuth salt such as bismuth chloride). In some embodiments, the composition of Formulation 2 may include substantially equivalent ppm of lead bromide and bismuth chloride.

Formulation 3

The electrolyte composition of Formulation 3 is the same as Formulation 2, except that it additional contains SynFac® 8120. Formulation 3 may include an amount of and SynFac® 8120 equal to 0.05 to 5 ml/L, such as 0.5 to 3 ml/L.

Comparative Example

Figure 3A:
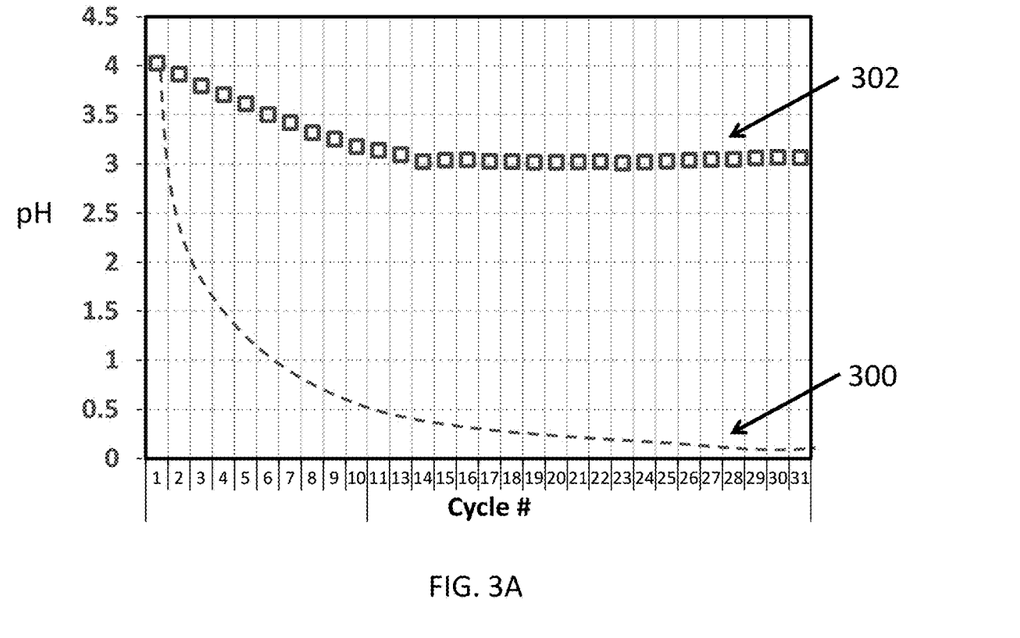
FIG. 3A is graph illustrating the pH of two electrolytes according to cycle number, according to various embodiments of the present disclosure.

FIG. 3A illustrates a graph showing changes in pH over charge/discharge cycles, for a first anti-dendrite agent containing electrolyte composition 300 and a second anti-dendrite agent free/chelating agent containing electrolyte composition 302, according to Formulation 1 above.

The first composition 300 includes a base electrolyte comprising an aqueous solution containing $ZnBr_2$, $ZnCl_2$, $Br_2$, a bromine sequestering agent, a metal plating enhancer and Syn Fac® 8120. The second composition 302 includes 0.50 M $Br_2$, 1.00 M sequestering agent, 1.64 M $ZnBr_2$ stock solution (75.06% $ZnBr_2$), 0.36 M $ZnCl_2$ stock solution (62.90% $ZnCl_2$) 50 ppm lead (in the form of a lead salt such as bromide), and HEDTA in the form of 2.5 ml/L Dissolvine® H40, as described above.

As can be seen in FIG. 3A, the pH of the first electrolyte 300 decreases as the number of cycles increases, such that after 30 cycles, the pH approaches zero. In particular, it is believed that bromine ions reacted with the Syn Fac® 8120, resulting in acid production and the resulting low pH. The produced acid may corrode flow battery components and reduce efficiency of the battery.

Figure 3B:
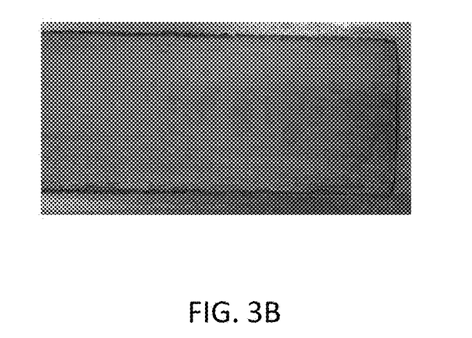
FIG. 3B is an image of the negative electrode in a metal-halide flow battery in which lead bromide and HEDTA chelating agents were added to the electrolyte solution.

In contrast, in the second composition 302, the pH stabilizes at a pH of about 3 after about 14 cycles. Accordingly, it is believed that the inclusion of the lead brominde and chelating agent (e.g., HEDTA) rather than Syn Fac® 8120 results in a more stable electrolyte composition. As such, the second composition 302 may provide higher battery efficiency and reduced component corrosion due to the higher stable pH. FIG. 3B illustrates a zinc layer plated on a negative electrode at a zinc loading of 200 mAh/cm$^2$, using the second composition 302. As shown in FIG. 3B, the plated zinc layer exhibited a smooth profile and lacked significant dendrite formation.

A system with the embodiment electrolyte and a method of using the embodiment electrolyte is described below.

Flow Battery System

The embodiment electrolyte formulations described above may be used in any of the flow battery systems such as the non-limiting systems described below resulting in increased energy capacity and energy efficiency of the flow battery system. Moreover, methods of operating the flow battery systems may include any suitable methods, such as the methods described below using the electrolyte compositions described above.

In an embodiment, the flow battery system may include a metal halogen flow battery comprising a plurality of flow battery cells and a liquid electrolyte reservoir fluidly connected to the flow battery, wherein the electrolyte comprises an aqueous solution of a metal-halide a halogen, and at least one of an anti-dendrite agent, an anti-corrosion agent, and a metal plating enhancer.

In an embodiment, the plurality of flow battery cells may include a stack of flow battery cells located in a cell chamber separate from the reservoir, and the cell chamber may be fluidly connected to the reservoir by a plurality of electrolyte conduits.

In an embodiment, each flow battery cell in the stack does not contain a separator in a reaction zone between the cell's anode and cathode electrodes. In an embodiment, the system may further include only the single liquid electrolyte reservoir. In an embodiment, system may include bromine as the halogen and the flow battery may be a zinc-bromine, zinc-chlorine, or zinc-chlorine-bromine flow battery configured to use a liquid electrolyte. In an embodiment, the aqueous solution of the metal-halide may include at least one of zinc bromide, zinc chloride, or a mixture of zinc chloride and zinc bromide. In a further embodiment, the liquid electrolyte may include a sequestering agent, such as a bromine sequestering agent.

Method of Operating the Flow Battery System

In an embodiment, a method of operating a flow battery system may include providing a liquid metal-halide electrolyte between a plurality of flow battery cells and a liquid electrolyte reservoir, wherein the liquid electrolyte comprises an aqueous solution of a metal-halide, a halogen, and at least one of an anti-dendrite agent, an anti-corrosion agent, and a metal plating enhancer.

In an embodiment, the method of operating a flow battery system may further include circulating the electrolyte between a plurality of flow battery cells that include a stack of flow battery cells located in a cell chamber separate from the reservoir and the reservoir through a plurality of electrolyte conduits using at least one pump.

In an embodiment, the method of operating a flow battery system may further include a flow battery where each flow battery cell in the stack does not contain a separator in a reaction zone between the cell's positive and negative electrodes. In an embodiment, the method may further include using a system with only the single liquid electrolyte reservoir. In an embodiment, the method may include the halogen is bromine and the aqueous solution is the metal-halide of at least one of zinc bromide, zinc chloride or a mixture of zinc chloride and zinc bromide. In an embodiment, the method may further include the liquid electrolyte with a sequestering agent, such as a bromine sequestering agent.

Further embodiments of the present invention are drawn to metal-halogen flow battery systems and methods of using these systems with the electrolyte compositions described above. The systems include flow architecture with a single flow circuit. Conventional metal halogen flow batteries maintain electrochemical efficiency by keeping reactant streams contained in two distinct flow loops by using a separator between the positive and negative electrodes of each flow cell and separate reservoirs for the electrolyte and the halogen reactant. The configurations below describe systems and methods for reactant handling that combine the simplicity and reliability of a single flow loop system with reactant separation balance of plant (BOP) components. Preferably, the single flow loop system includes a stack of flow battery cells without a separator between the positive and negative electrodes of each flow cell (i.e., the reaction zone is not partitioned) and a common reservoir for the electrolyte and the concentrated halogen reactant.

The electrochemical (e.g., flow battery) system can include a vessel containing one or more electrochemical cells (e.g., a stack of flow battery cells) in its inner volume, a metal-halide electrolyte, and a flow circuit configured to deliver the metal-halide electrolyte to the electrochemical cell(s). The flow circuit may be a closed loop circuit that is configured to deliver the electrolyte to and from the cell(s). In many embodiments, the loop circuit may be a sealed loop circuit.

Each of the electrochemical cell(s) may comprise a first, fluid permeable electrode, which may serve as a positive electrode, a second, fluid impermeable electrode, which may serve as a negative electrode, and a reaction zone between the electrodes. The first electrode may be a porous electrode or contain at least one porous element. The first electrode may comprise a porous or a permeable carbon, metal or metal oxide electrode. For example, the first electrode may comprise porous carbon foam, a metal mesh or a porous mixed metal oxide coated electrode, such as a porous titanium electrode coated with ruthenium oxide (i.e., ruthenized titanium). In discharge and charge modes, the first electrode may serve as a positive electrode at which the halogen may be reduced into halogen ions. The second electrode may comprise a primary depositable and oxidizable metal, i.e., a metal that may be oxidized to form cations during the discharge mode. For example, the second electrode may comprise a metal that is of the same type as a metal ion in one of the components of the metal halide electrolyte. For example, when the metal halide electrolyte comprises zinc halide, such as zinc chloride or zinc bromide, the second electrode may comprise metallic zinc. Alternatively, the second electrode may comprise another material, such as titanium that is plated with zinc.

Preferably, the reaction zone lacks a separator and the electrolyte circulates through the same flow path (e.g., single loop) without a separation between the electrodes in each cell. In other words, the reaction zone may be such that it does not contain a membrane or a separator between the positive and negative electrodes of the same cell that is impermeable to the halogen ions in the electrolyte. Furthermore, the cell may be a hybrid flow battery cell rather than a redox flow battery cell. Thus, in the hybrid flow battery cell, a metal, such as zinc is plated onto one of the electrodes, the reaction zone lacks an ion exchange membrane which allows ions to pass through it (i.e., there is no ion exchange membrane between the cathode and anode electrodes) and the electrolyte is not separated into a catholyte and anolyte by the ion exchange membrane. The electrolyte is stored in one reservoir rather than in separate catholyte and anolyte reservoirs.

Preferably, the electrochemical system may be reversible, i.e., capable of working in both charge and discharge operation mode. The reversible electrochemical system usually utilizes at least one metal halide in the electrolyte, such that the metal of the metal halide is sufficiently strong and stable in its reduced form to be able to form an electrode. The metal halides that can be used in the reversible system include zinc halides, as element zinc is sufficiently stable to be able to form an electrode. Preferably, the electrolyte is aqueous solution of at least one metal halide electrolyte compound, such as $ZnBr_2$ and/or $ZnCl_2$. For example, the solution may be a 15-50% aqueous solution of $ZnBr_2$ and/or $ZnCl_2$, such as a 25% solution. In certain embodiments, the electrolyte may contain one or more additives, which can enhance the electrical conductivity of the electrolytic solution. For example, when the electrolyte contains $ZnCl_2$, such additive can be one or more salts of sodium or potassium, such as NaCl or KCl. When the electrolyte contains $ZnBr_2$, then the electrolyte may also contain a bromine sequestering agent, such as such as a quaternary ammonium bromide (QBr), such as 1-ethyl-1-methyl-morpholinium bromide (MEM), 1-ethyl-1-methyl-pyrrolidinium bromide (MEP) or Tetra-n-butylammonium bromide (TBA)). Some other examples of bromine sequestering agents mentioned above include, 1-dodecyl-1-methylmorpholinium bromide, 1-dodecyl-1-methylpyrrolidinium bromide, 1-dodecylpyridinium bromide, dodecyltrimethylammonium bromide, and benzyldodecyldimethylammonium bromide. In an embodiment, these compounds include any substitution derivatives of the compounds listed (e.g., those containing additional alkyl substituents) as well as different alkyl chain lengths.

Figure 1:
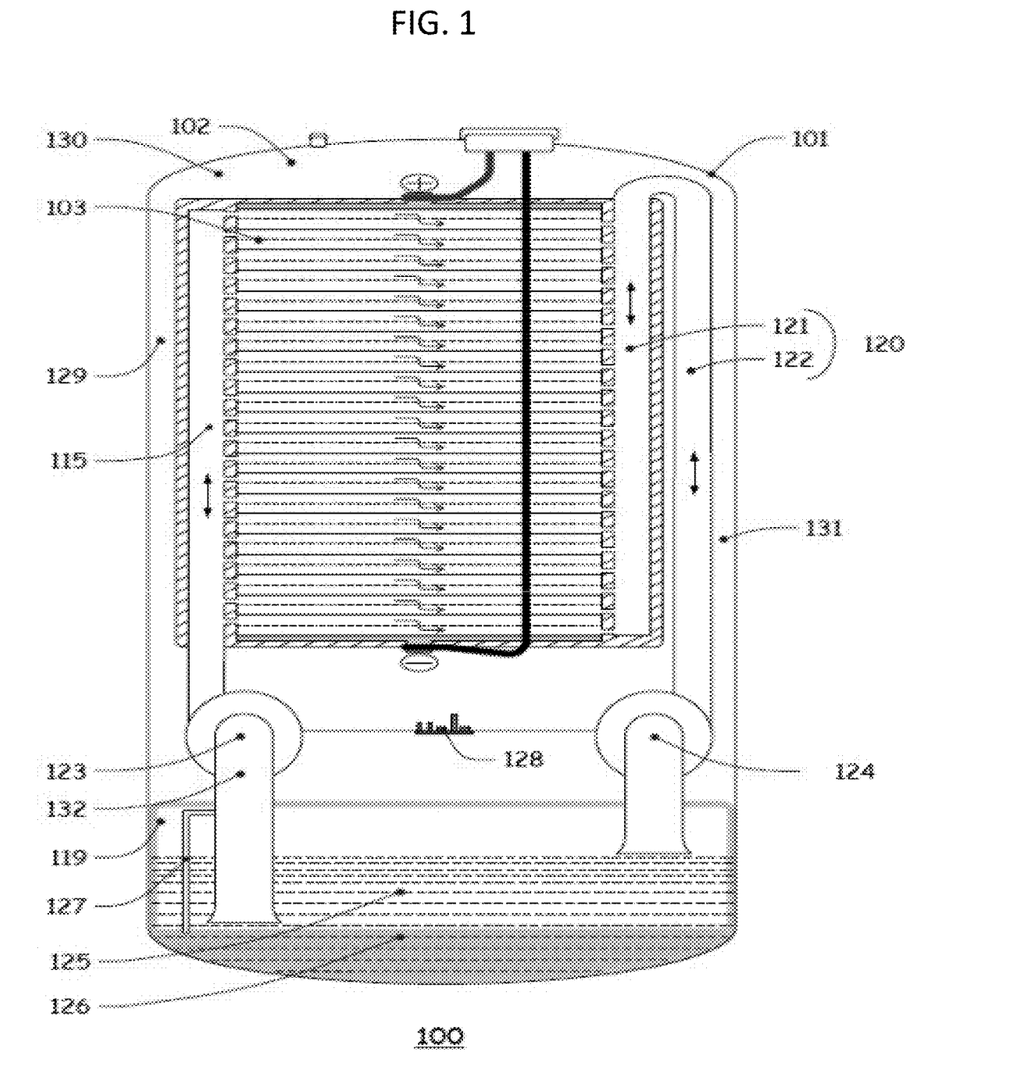
FIG. 1 illustrates a side cross sectional view of an embodiment of the electrochemical system with a sealed container containing a stack of electrochemical cells.

FIG. 1 illustrates an electrochemical which includes a stack of flow battery cells in a sealed container 102. The flow battery cells inside the sealed container 102 are preferably a horizontally positioned cell, which may include a horizontal positive electrode and horizontal negative electrode separated by a gap. For example, element 103 in FIG. 1 represents a vertical stack of horizontally positioned electrochemical cells (i.e., flow cells) connected electrically in series.

As shown in FIG. 1, a feed (e.g., inlet) conduit (e.g., pipe or manifold 115) is configured to deliver the metal-halide electrolyte to the horizontally positioned cells of the stack 103. A return (e.g., outlet) conduit (e.g., pipe or manifold) 120 is configured to collect products of an electrochemical reaction from cells of the stack. The return pipe or manifold 120 may be an upward-flowing return pipe or manifold. The pipe or manifold 120 includes an upward running section 121 and a downward running section 122. The flow of the metal-halide electrolyte and the concentrated halogen reactant leaves the cells of the stack 103 upward through the section 121 and then goes downward to the reservoir through the section 122. As will be discussed in more detail below, in some embodiments, the feed pipe or manifold and/or the return pipe or manifold may be a part of a stack assembly for the stack of the horizontally positioned cells. In some embodiments, the stack 103 may be supported directly by walls of the vessel 102. Yet in some embodiments, the stack 103 may be supported by one or more pipes, pillars or strings connected to walls of the vessel 102 and/or reservoir 119.

The flow battery system may include one or more pumps for pumping the metal-halide electrolyte. Such a pump may or may not be located within the inner volume of the sealed vessel. For example, FIG. 1 shows discharge pump 123, which fluidly connects the reservoir 119 and the feed pipe or manifold 115. The pump 123 is configured to deliver the metal-halide electrolyte through the feed pipe or manifold 115 to the stack of flow battery cell(s) 103. In some embodiments, the flow battery system may include an optional additional pump 124. The pump 124 fluidly connects the return pipe or manifold 120 to the reservoir 119 and can be used to deliver the metal-halide electrolyte through the return pipe or manifold to the stack of cell(s) in charge and/or discharge mode. Alternatively, pump 124 may be omitted and the system may comprise a single flow loop/single pump flow battery system. Any suitable pumps may be used in the system, such as centripetal and/or centrifugal pumps.

The reservoir 119 may contain a feed line 127 for the concentrated halogen reactant, which may supply the halogen reactant to the feed pipe or manifold 115 of the system. As used herein, a "concentrated halogen reactant" includes aqueous electrolyte with higher than stoichiometric halogen content (e.g., higher halogen content than 1:2 zinc to halogen ratio for zinc-halide electrolyte), pure liquid halogen (e.g., liquid chlorine and/or bromine) or chemically-complexed halogen, such as a bromine-MEP or another bromine-organic molecule complex. A connection between the halogen reactant feed line 127 and the feed pipe manifold 115 may occur before, at or after the pump 123. An inlet of the feed line 127 is located in the lower part 126 of the reservoir 119, where the complexed bromine reactant may be stored. An outlet of the feed line 127 is connected to an inlet of the pump 123. The electrolyte intake feed line, such as a pipe or conduit 132, is located in the upper part 125 of the reservoir 119, where the lighter metal-halide electrolyte (e.g., aqueous zinc bromide) is located.

In some embodiments, the electrochemical system may include a controlling element, which may be used, for example, for controlling a rate of the pump(s). Such a controlling element may be an analog circuit. FIG. 1 depicts the controlling element as element 128.

Flow Configurations

Figure 2A:
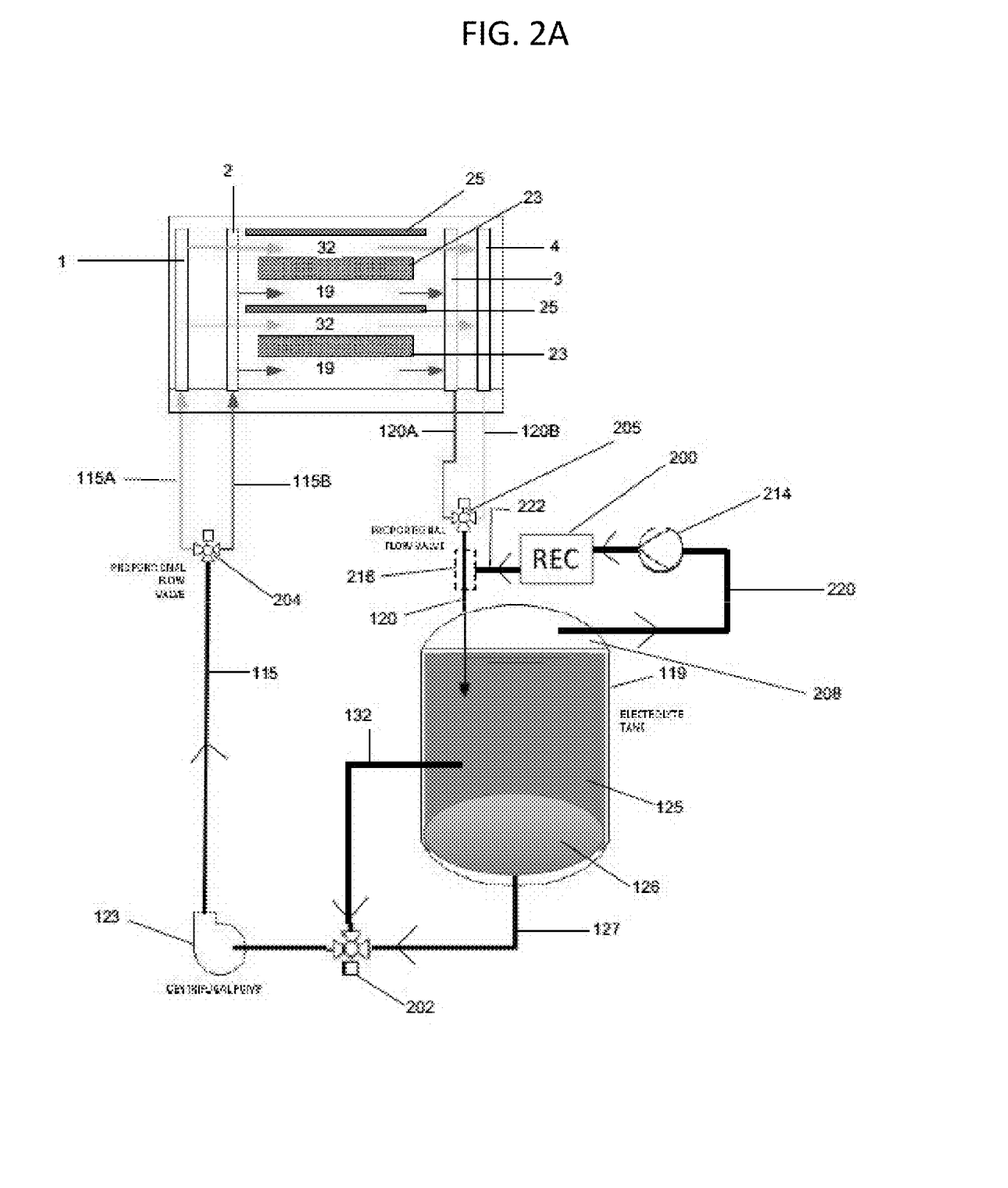
FIG. 2A illustrates a schematic side cross sectional view of flow paths in the embodiment electrochemical system.
Figure 2B:
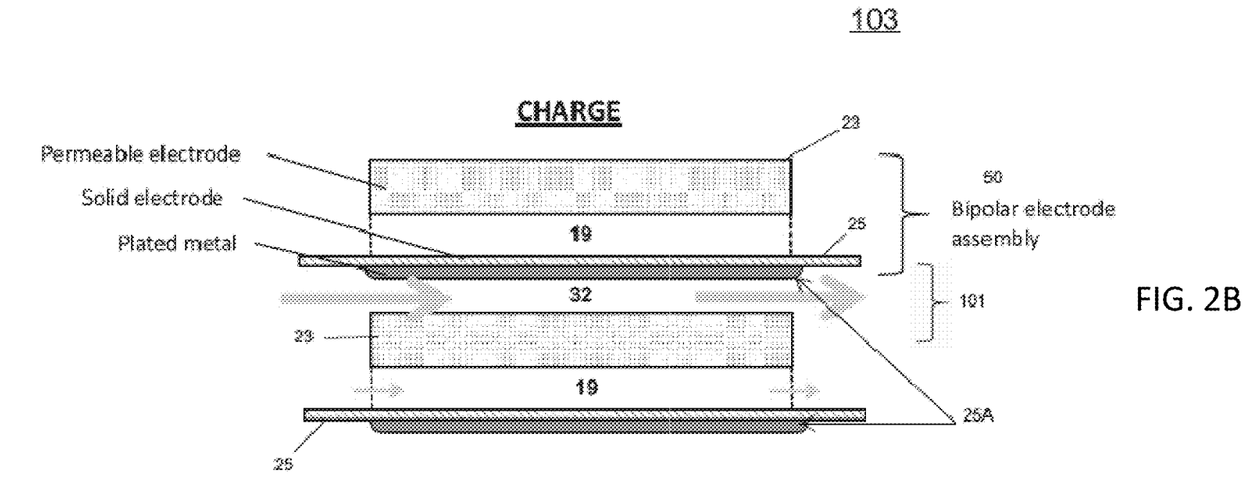
FIGS. 2B and 2C illustrate schematic side cross sectional views of flow paths in the flow battery cells of the system of FIG. 2A.
Figure 2C:
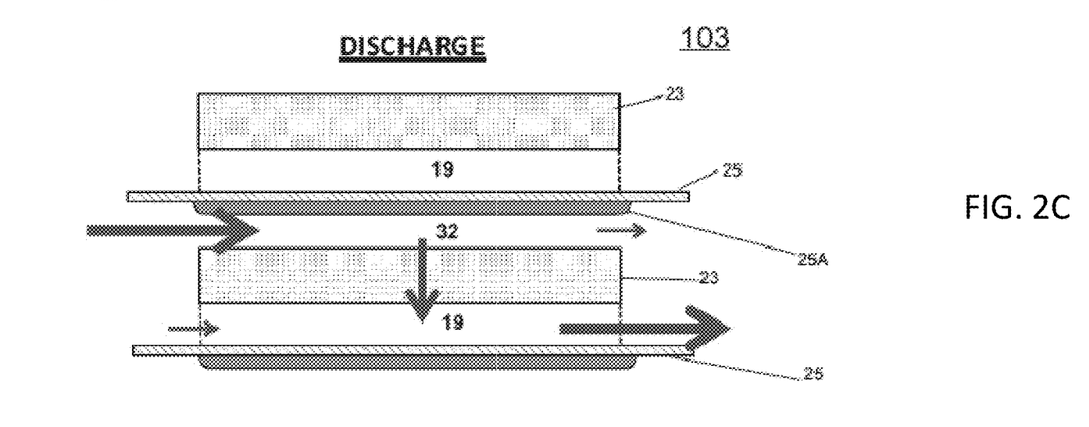

FIGS. 2B and 2C schematically illustrate respective charge mode and discharge mode paths for a flow of the metal-halide electrolyte and the halogen reactant through the horizontally positioned cells of the stack, such as the stack 103 of FIGS. 1 and 2A. The electrolyte flow paths in FIGS. 2A-2C are represented by arrows. The reservoir 119 may contain one or more internal liquid portions as well as one or more internal gaseous portions. In this embodiment, the reservoir 119 includes two liquid portions 125 and 126, and one gaseous portion 208. Gaseous species, such as halogen (e.g. $Cl_2$ or $Br_2$) and hydrogen gas, are stored in the upper portion 208 (e.g., head space) of the reservoir 119. The reservoir 119 may also include internal structures or filters (not shown for clarity). A liquid pump (e.g., centrifugal pump 123) may be used to pump the electrolyte from upper liquid portion 125 of the reservoir 119 via conduit 132 which has an inlet in portion 125 of the reservoir. Conduit 127 has an inlet in the lower liquid portion 126 of the reservoir 119 where the majority of the concentrated halogen reactant is located. In charge mode, conduit 127 is closed by valve 202 such no concentrated halogen reactant flows into the stack 103 via conduit 127 during charge mode. In discharge mode, valve 202 is open to allow halogen reactant to flow into the stack 103 via conduit 127.

Each flow battery cell 101 in the stack 103 includes a porous (e.g., fluid permeable) electrode 23 and a non-porous (e.g., fluid impermeable) electrode 25. As described above, the permeable electrode 23 may be made of any suitable material, such as a titanium sponge or mesh. The impermeable electrode 25 may be made of any suitable material, such as titanium. A layer of metal 25A, such as zinc, is plated on the impermeable electrode 25 (e.g., on the bottom surface of electrode 25), as shown in FIGS. 2B and 2C. For zinc may be plated to a thickness of about 1.0 mm to about 1.5 mm, in a reaction zone which may have a width (i.e., height in the vertical direction) of from about 1.5 mm to about 2 mm. The reaction zone 32 is located between and separates the impermeable electrode 25/layer of metal 25A and the permeable electrode 23.

FIG. 2B illustrates the flows through the stack 103 of FIG. 2A during charge mode. In the charge mode, aqueous halogen electrolyte is pumped by the pump 123 from the upper liquid portion 125 of the reservoir 119 through conduit 132 into conduit 115. Conduit 115 contains a first flow valve, such as a proportional three way valve 204. Valve 204 may be a computer controlled valve. The valve sends a majority (e.g., 51-100%, such as 60-95%, including 70-90%) of the electrolyte into conduit 115A, and a minority (e.g., 0-49%, such as 5-40%, including 10-30%) of the electrolyte (including no electrolyte) into conduit 115B. Conduit 115A is fluidly connected to the first stack inlet manifold 1 and conduit 115B is fluidly connected to the second stack inlet manifold 2, as will be described in more detail below.

The first stack inlet manifold 1 provides the major portion of the electrolyte to the reaction zone 32 of each cell 101, while the second stack inlet manifold 2 provides a minority of the electrolyte (or no electrolyte) to the space (e.g., one or more flow channels) 19 between the cells 101 located between the permeable electrode 23 of a first cell 101 and an impermeable electrode 25 of an adjacent second cell 101 located below the first cell in the stack 103. The electrodes 23, 25 of adjacent cells may be connected to each other to form a bipolar electrode assembly 50 as will be described in more detail below. Metal, such as zinc, plates on the bottom of the impermeable electrode 25 forming a metal layer 25A in the reaction zone 32. Halogen ions (such as chloride or bromide) in the aqueous electrolyte oxidize to form a diatomic halogen molecule (such as $Cl_2$, $Br_2$) on the permeable electrode 23.

The majority of the electrolyte flows through the reaction zone 32 and exits into first stack outlet manifold 3. The minority of the electrolyte (or no electrolyte) flowing in the flow channel(s) 19 between the cells 101 exits into the second stack outlet manifold 4.

Manifold 3 provides the electrolyte into conduit 120A while manifold 4 provides the electrolyte into conduit 120B. Conduits 120A and 120B converge at a second flow valve, such as a proportional three way valve 205. Valve 205 may be a computer controlled valve. Valve 205 is connected to the outlet conduit 120 and controls the electrolyte flow volume into conduit 120 from conduits 120A and 120B. Conduit 120 provides the electrolyte back into the upper liquid portion 25 of the reservoir 119.

Thus, in the charge mode, the metal halide electrolyte is pumped by pump 123 from the reservoir 119 through an inlet conduit (e.g., one or more of flow pathways 132, 115, 115A, 1) to the reaction zone 32 of each flow cell 101 in the stack 103 in one direction (e.g., left to right in FIG. 2B). A majority of the metal halide electrolyte enters the reaction zone 32 from the inlet conduit (e.g., from manifold 1 portion of the inlet conduit) without first flowing through the permeable electrode 23 in the flow cell 101 or through the flow channel 19 located between adjacent flow cell electrodes 23, 25 in the stack 103. The metal halide electrolyte then flows from the reaction zone 32 of each flow cell in the stack through an outlet conduit (e.g., one or more of flow pathways 3, 120A, 120) to the reservoir 119, such that the majority of the metal halide electrolyte does not pass through the permeable electrode 23 in each flow cell 101 before reaching the outlet conduit (e.g., manifold 3 portion of the outlet conduit).

FIG. 2C illustrates the flows through the stack 103 of FIG. 2A during discharge mode. In discharge mode, valve 202 in conduit 127 is opened, such that the aqueous electrolyte and concentrated halogen reactant (e.g., complexed bromine) are pumped by pump 123 from the respective middle portion 125 and the lower liquid portion 126 of the reservoir 119 to respective conduits 132 and 127.

The electrolyte and the concentrated halogen reactant are provided from respective regions 125 and 126 of the reservoir 119 via conduits 132 and 127. The mixture flows from conduit 115 via valve 204 and conduit 115A and optionally conduit 115B to respective inlet manifolds 1 and 2. As in the charge mode, the majority of the electrolyte and concentrated halogen reactant mixture flows into the inlet manifold 1 and a minority of the mixture (or no mixture) flows into the inlet manifold 2.

The electrolyte and concentrated halogen reactant (e.g., complexed bromine) mixture enters the reaction zone 32 from manifold 1. In other words, the mixture enters the cell reaction zone 32 between the electrodes 23, 25 from the manifold without first passing through the permeable electrode 23. Since the complexed bromine part of the mixture is heavier than the electrolyte, the complexed bromine flows through the permeable electrode 23 at the bottom of each cell 101. In the discharge mode, complexed bromine passing through the permeable electrode 23 is reduced by electrons, resulting in the formation of bromine ions. At the same time, the metal layer 25A on the impermeable electrode 25 is oxidized, resulting in metal (e.g., zinc) ions going into solution in the electrolyte. Bromine ions formed in the discharge step are provided into the flow channel(s) 19 between the cells 101, and are then provided from the flow channel(s) 19 through the second stack outlet manifold 4 into conduit 120B. The electrolyte rich in zinc ions is provided from the reaction zone 32 through the first stack outlet manifold 3 into conduit 120A. The bromine ions in conduit 120B and the zinc rich electrolyte in conduit 120A are mixed in valve 205 and then provided via conduit 120 back to the middle portion 125 of the reservoir.

Thus, in the discharge mode, the mixture of the metal halide electrolyte and the concentrated halogen reactant (e.g., complexed bromine) flows from the reservoir 119 through the inlet conduit (e.g., one or more of flow pathways 132, 115, 115A, 1) to the reaction zone 32 of each flow cell 101 in the stack 103 in the same direction as in the charge mode (e.g., left to right in FIG. 2C). A majority of the mixture enters the reaction zone 32 from the inlet conduit without first flowing through the permeable electrode 23 in the flow cells 101 or through the flow channel 19 located between adjacent flow cell 101 electrodes 23, 25 in the stack 103. The mixture then flows from the reaction zone 32 of each flow cell 101 in the stack 103 through the outlet conduit (e.g., one or more of flow pathways 3, 120A, 120) to the reservoir 119, such that a majority of the mixture passes through the permeable electrode 23 in each flow cell 101 before reaching the outlet conduit (e.g., the manifold 3 portion of the outlet conduit).

Thus, in charge mode, the majority of the flow is "flow-by" (e.g., the majority of the liquid flows by the permeable electrode through the reaction zone), while in discharge mode, the majority of the flow is "flow-through" (e.g., the majority of the liquid flows through the permeable electrode from the reaction zone) due to the difference in the reaction kinetics in charge and discharge modes.

In an example of a zinc-bromide flow battery, during charge mode, an electron is accepted in a reduction process (e.g., $Zn^{2+}+2e^- \rightarrow Zn$) at the negative (e.g., non-porous) electrode of each cell, while electrons are given away in an oxidation process (e.g., $Br^- \rightarrow Br_2+2e^-$) at the positive (e.g., porous) electrode. The process is reversed during the discharge mode. In this example, the electrolyte may be aqueous zinc bromide while the concentrated halogen may be liquid bromine, a bromine complex (e.g., a bromine-MEP complex) or a mixture thereof with the aqueous zinc bromide.

Valves 204 and/or 205 may be used control the ratio of liquid flow rate between the two inlet paths (e.g., 115A/115B) and/or between the two outlet paths (e.g., 120A/120B). Thus, the net amount of liquid that flows through the permeable electrode 23 may be controlled in charge and/or discharge mode. For example, in charge mode, the valve 205 may be adjusted to provide a higher liquid flow rate through manifold 3 and conduit 120A and a lower liquid flow rate through manifold 4 and conduit 120B to favor the "flow-by" flow configuration. In contrast, in discharge mode, the valve 205 may be adjusted to provide a lower liquid flow rate through manifold 3 and conduit 120A and a higher liquid flow rate through manifold 4 and conduit 120B compared to the charge mode to favor the "flow-through" flow configuration.

In charge mode, the majority of the flow is "flow-by" because this is preferable for the metal plating reaction and sufficient for the halogen oxidation reaction. For the metal plating reaction, it is important to maintain an adequate concentration of metal ions (e.g. $Zn^{2+}$) near the surface of the impermeable electrode 25 onto which the metal layer 25A will be plated. Insufficient flow speed at the exit end of the plating area (which might occur in the "flow-through" arrangement used during discharge) could lead to metal ion starvation and poor plating morphology, particularly at high stack open current when the bulk concentration of metal ions is at its lowest. The halogen oxidation reaction that takes place on the permeable electrode 23 (e.g. bromide ions oxidized to bromine) in the charge mode can be adequately supplied with reactants in either a "flow-by" or a "flow-through" arrangement.

In contrast, in the discharge mode, the majority of the flow is "flow-through" because this is sufficient for the metal layer 25A de-plating reaction and preferable for the halogen reduction reaction. The reactant in the metal de-plating reaction (i.e., zinc layer 25A) is already available along the entire surface of the impermeable electrode 25, where it was plated during the charge mode. As a result, both "flow-by" and "flow-through" are adequate to support this reaction.

For the halogen reduction reaction (e.g. bromine reducing to bromide ions), it is important to supply an adequate concentration of halogen to the active surface of the permeable electrode 23. The molecular halogen is not as mobile as its ionic counterpart, particular if a sequestering agent is used, so much more surface area and reactant flow rate is needed to support the halogen reduction reaction than the halogen oxidation reaction. Flowing through the permeable electrode 23 achieves this reactant supply requirement.

Thus, charge and discharge inlet flows no longer need to flow on opposite sides of the cell frame and/or in opposite directions. Rather, the same first stack inlet manifold 1 and the same pump 123 may be used to supply the majority of the flow to the reaction zone 32 during both charge and discharge modes. Thus, the majority of the liquid in both the charge and discharge mode flows in the same direction through the reaction zone in both modes and the majority of the liquid in both the charge and discharge mode enters the reaction zone 32 directly from the inlet manifold 1 without first flowing through the permeable electrode 23 or the flow channel(s) 19 between the cells 101. Thus, manifold 1 may be referred to as the "main inlet manifold."

If desirable, the second stack inlet manifold 2 may be used to supply a minority of the flow through the flow channel(s) 19 between the opposite electrodes 23, 25 of adjacent flow cells 101 to the bottom side of the permeable electrode 23 (i.e., the side of electrode 23 facing the flow channel(s) 19) during charge and/or discharge modes. These charge mode electrolyte purge flow and/or discharge mode electrolyte—complexed bromine mixture purge flow may be useful to prevent bubbles or denser complex phase liquid from accumulating beneath the permeable electrode 23 in the flow channel(s). Thus, the second stack inlet manifold may be referred to as the "secondary inlet manifold" or the "purge inlet manifold". The purge flows flow from the channel(s) 19 to the second stack outlet manifold 4. Alternatively, the second stack inlet manifold 2 and conduit 115B may be omitted to simplify the overall system design.

The flow battery system of FIG. 2A may also include an optional recombinator 200 and a gas pump 214. The recombinator is a chamber containing a catalyst which promotes or catalyzes recombination of hydrogen and halogen, such as bromine. The gas pump 214 provides halogen and hydrogen gas from the upper portion 208 of the reservoir 119 via conduit 220 to the recombinator 200. The hydrogen and halogen gases react with each other in the recombinator 200 to form a hydrogen-halogen compound. The hydrogen-halogen compound is then returned to the middle portion (e.g., upper liquid portion) 125 of the reservoir 119 from the recombinator 200 via conduits 222 and 120 by the action of the pump 214.

In another embodiment, the pump 214 is replaced with a venturi injector 216, as shown in FIG. 2A. Thus, the system preferably contains either the pump 214 or the venturi 216, but in some embodiments the system may contain both of them. Thus, the venturi is shown with dashed lines. The hydrogen-halogen compound is drawn from the recombinator 200 into conduit 222 which merges into the venturi injector. The hydrogen-halogen compound mixes with the electrolyte flow being returned from the stack 103 to the reservoir 119 in the venturi injector 206 and the mixture is returned to the reservoir 119 via the return conduit 120.

Figure 2D:
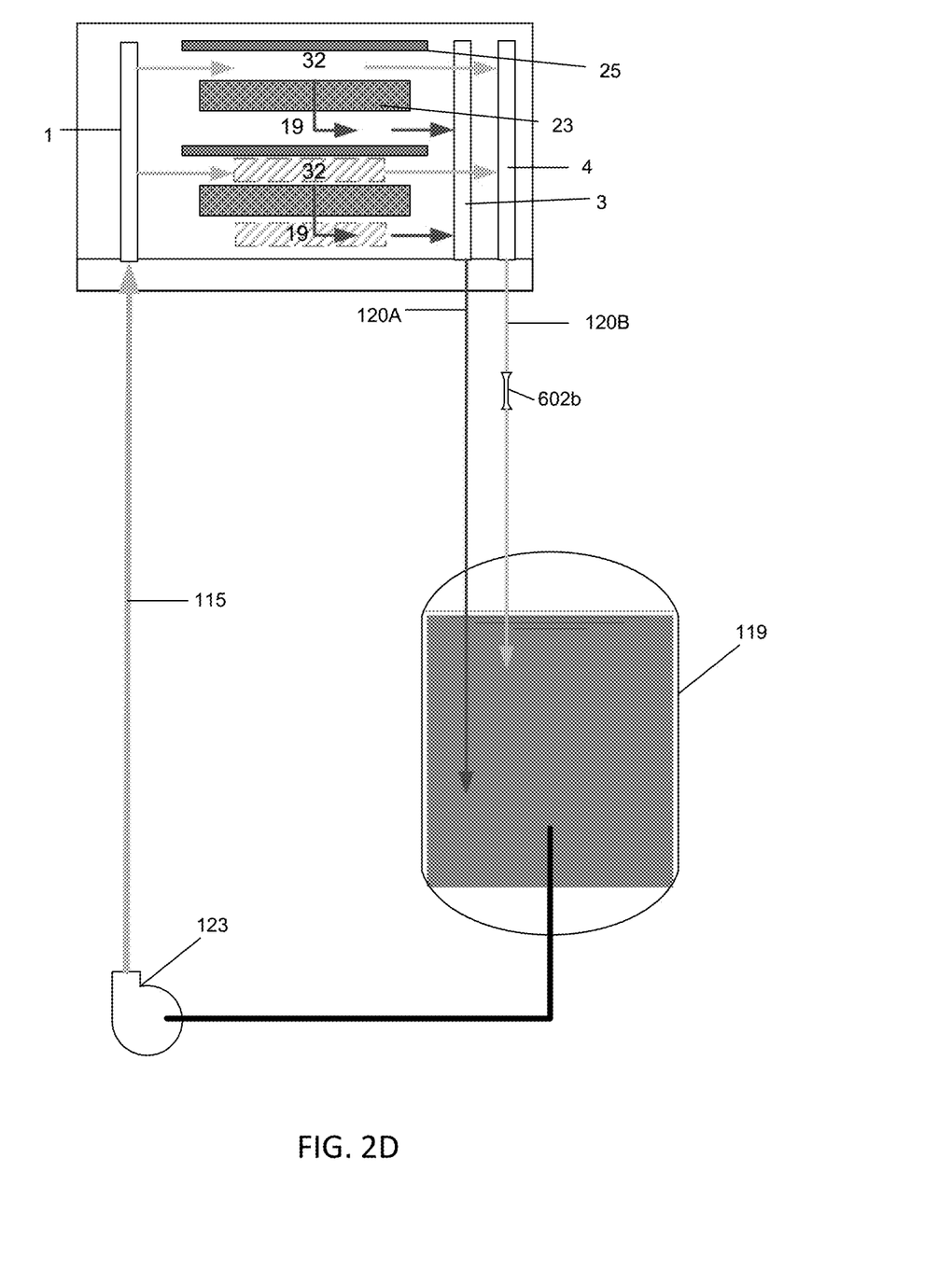
FIG. 2D illustrates a schematic side cross sectional view of flow paths in an electrochemical system according to various embodiments of the present disclosure.

FIG. 2D schematically illustrates an alternative embodiment of a flow battery, showing flow paths for a flow of metal-halide electrolyte and the halogen reactant through the horizontally positioned cells of a stack. The main inlet is provided by conduit 115, through which electrolyte may flow from the reservoir 119 to the manifold 1. Thus, in this embodiment there is one common inlet conduit 115 and inlet manifold 1 for both charge and discharge modes. Conduit 120B may be configured with a calibrated pipe restriction 602b in order to control the flow ratio of the flow streams between conduits 120A and 120B. Preferably conduit 120A lacks the restriction. By placing the calibrated flow restriction 602b in conduit 120B, fluid dynamics may force a majority of fluid flow (e.g., 80%) from reaction zone 32 through the porous electrode 23 and region 19 to manifold 3 and conduit 120A in both the charge and discharge modes. At the same time, a minority of the fluid flow (e.g., 20%) may exit from reaction zone 32 through manifold 4 and conduit 120B without flowing through the porous electrode 23. The fixed restriction should be sufficient to control the amount of flow into each outlet path, thus allowing for a simpler and more reliable system by having fewer valves and having cell geometry optimized for one flow condition.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A flow battery system, comprising: a stack of flow battery cells that do not contain a separator in reaction zones formed between anode and cathode electrodes of each flow battery cell;

a reservoir connected to the reaction zones of the stack; and a liquid electrolyte disposed in the reservoir, the electrolyte comprising: zinc bromide;

a chelating agent comprising N-{2-[Bis(carboxymethyl)amino]ethyl}-N-(2-hydroxyethyl)glycine (HEDTA);

at least one metal plating enhancer comprising a bismuth salt; and a bromine sequestering agent;

wherein the electrolyte further comprises both an anti-dendrite agent and an anti-corrosion agent;

wherein the anti-dendrite agent is bisphenol A alkoxylate (BPA).

2. The system of claim 1, wherein the anti-corrosion agent is the poly(oxy ether), and wherein the poly(oxy ether) has a molecular weight of at least 4000 Daltons.

3. The system of claim 1, wherein the electrolyte further comprises zinc chloride.

4. The system of claim 1, wherein:

the anti-corrosion agent comprises poly(ethylene oxide) (PEG) having a molecular weight of at least 4000 Daltons.

5. The system of claim 1, wherein the sequestering agent is at least one of a morpholinium, pyrrolidinium, imidazolium, picolinium, pyridinium, or ammonium bromide salt (QBr).

6. The system of claim 5, wherein the sequestering agent is at least one of 1-dodecyl-1-methylmorpholinium bromide, 1-dodecyl-1-methylpyrrolidinium bromide, 1-dodecylpyridinium bromide, dodecyltrimethylammonium bromide, benzyldodecyldimethylammonium bromide, tetrabutylammonium bromide, 1-ethyl-1-methylpyrrolidinium bromide (MEP), and 1-ethyl-1-methyl-morpholinium bromide (MEM).

7. The system of claim 1, wherein the metal plating enhancer further comprises a lead salt.

8. The system of any of claim 7, wherein the lead salt comprises $PbCl_2$, $PbBr_2$, or a combination of $PbCl_2$ and $PbBr_2$.

9. The system of claim 8, wherein the bismuth salt is at least one of bismuth oxide, bismuth chloride, and bismuth citrate.

* * * * *